United States Patent [19]

Gantier

[11] 4,082,010
[45] Apr. 4, 1978

[54] DEVICE FOR ROTATIONAL TRANSMISSION OF MECHANICAL POWER DEPENDING ON AN ANGULAR SPEED SELECTOR WHICH FUNCTIONS AS A RESULT OF THE RESISTANCE WHICH IT MEETS

[76] Inventor: Pierre Gantier, 8 rue des Oiseaux, 37000 Tour, France

[21] Appl. No.: 655,541

[22] Filed: Feb. 5, 1976

Related U.S. Application Data

[63] Continuation of Ser. No. 450,835, Mar. 13, 1974, abandoned.

[51] Int. Cl.² .............................................. F16H 1/28
[52] U.S. Cl. ..................................................... 74/800
[58] Field of Search ............................ 74/5.7, 60, 800; 310/82

[56] References Cited

U.S. PATENT DOCUMENTS

| | | | |
|---|---|---|---|
| 1,246,918 | 11/1917 | Hayes | 74/800 X |
| 2,144,110 | 1/1939 | Herrick | 74/800 X |
| 2,305,505 | 12/1942 | Wagner | 74/800 X |
| 2,949,041 | 8/1960 | Wildhaber | 74/800 X |
| 3,139,771 | 7/1964 | Maroth | 74/800 |

FOREIGN PATENT DOCUMENTS

586,985    4/1947   United Kingdom ..................... 74/60

*Primary Examiner*—Samuel Scott
*Assistant Examiner*—Lance W. Chandler
*Attorney, Agent, or Firm*—McGlew and Tuttle

[57] ABSTRACT

The power transmission comprises a drive guide shaft and a driven receiver shaft coaxial with the drive shaft, the two shafts having facing ends spaced axially from each other. A secondary shaft extends at an angle to the common axis of the drive and driven shafts, and a universal joint interconnects the facing end of the drive shaft to a first end of the secondary shaft, with the axis of symmetry of all three shafts intersecting at the geometrical center of the universal joint. A frusto-conical internal ring gear is rotatable with the driven shaft and a frusto-conical pinion is rotatable with the secondary shaft and meshes with the internal ring gear, the pinion being positioned intermediate the ends of the secondary shaft and the apices of the frusto-conical surfaces of the internal ring gear and the pinion intersecting the common axis at the geometrical center of the universal joint. A spacer, in a support rotatable with the driven shaft, is formed with an annular channel receiving and guiding the opposite end of the secondary shaft for revolving of the secondary shaft about the common axis of the drive and driven shafts, and an inertia element is integral with the secondary shaft for rotation therewith to regulate the speed thereof.

8 Claims, 1 Drawing Figure

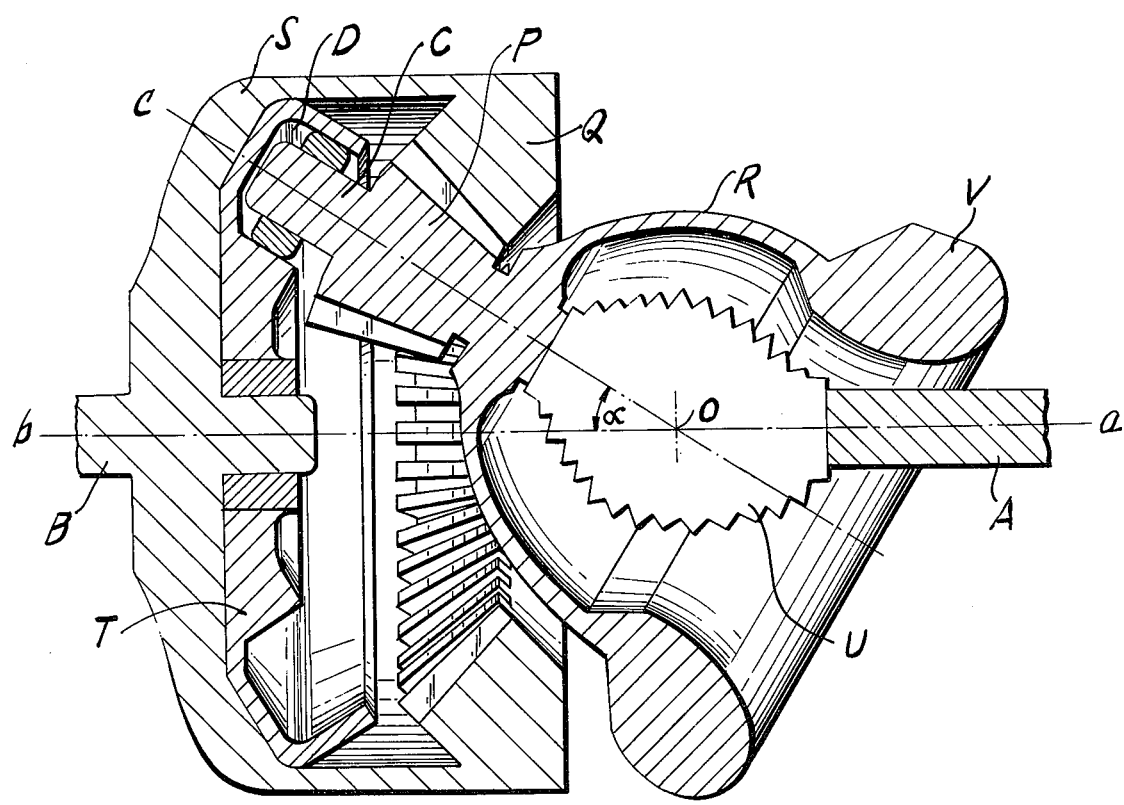

DEVICE FOR ROTATIONAL TRANSMISSION OF MECHANICAL POWER DEPENDING ON AN ANGULAR SPEED SELECTOR WHICH FUNCTIONS AS A RESULT OF THE RESISTANCE WHICH IT MEETS

This is a continuation of application Ser. No. 450,835 filed Mar. 13, 1974, now abandoned.

FIELD AND BACKGROUND OF THE INVENTION

This invention relates to a power transmission including an annular speed selector which functions as a result of the resistance which it encounters. More particularly, the present invention utilizes the precession force of a gyroscope, which is an inertia wheel usually rotated at a high angular velocity.

In accordance with the invention, the power transmission shaft is divided into a drive guide shaft and a driven receiver shaft coaxial with the drive guide shaft, the two shafts having facing ends spaced axially from each other. This spacing provides a free space for mounting a universal joint which interconnects the inner end of the drive guide shaft to a first end of a secondary shaft which extends at an angle to the common axis of the drive and driven shafts. The axes of symmetry of all three shafts intersect at the geometrical center of the universal joint. The universal joint can be a ball and socket joint, a gimbal or any other type of universal joint which will transmit exactly, and without stress, rubbing or friction, the angular speed of the drive guide shaft as deflected at an angle through the secondary shaft extending at an angle to the common axis of the drive and driven shafts.

The universal joint, which may be of any suitable type, must be homokinetic and maintain unchanged the position of the point of intersection of the axes of symmetry of the three shafts. A cup-shaped support is secured to or is integral with the driven receiver shaft, and a frusto-conical ring gear is formed integrally of the internal surface of the periphery of the support. This ring gear meshes with a frusto-conical pinion which is formed integrally with the secondary shaft intermediate the ends of the latter. The cup-shaped support has a spacer mounted or seated therein and formed with an annular channel in which there is engaged a roller rotatable on the opposite end of the secondary shaft. This arrangement allows constant positioning of the parts providing for the free rotation of the receiver shaft and the secondary shaft.

The spacer may be a part separate from the support, or may be integral therewith. A counterweight, in the form of a bell-shaped member having a thickened rim, is secured to or is integral with the end of the secondary shaft adjacent the common axis of the drive and driven shaft.

The spacer has an annular track which is coaxial with the axis of summetry of the driven receiver shaft, and the free end of the secondary shaft revolves around the common axis of the drive and driven shafts. The annular track may be formed in a separate spacer or may be cut into the "bottom" of the cup-shaped support. The purpose of the annular track is to maintain the angle between the common axis of the drive and driven shafts and the axis of the secondary shaft at a constant value. Under these conditions, the secondary shaft revolves around the axis of symmetry of the drive guide shaft, describing a conical surface of revolution whose apex is at the geometrical center of the universal joint.

The inertia device may be in the form of a bell which is integral with the secondary shaft and has a thickened rim, and the center of gravity of all of the parts is at the intersection of the axes of symmetry of the three shafts at the geometrical center of the universal joint. This obtains the necessary static and dynamic equilibrium of the transmission, first by the fact that the center of gravity is symmetrical with the secondary shaft and second by the fact that the center of gravity is divided into two parts by an imaginary perpendicular plane passing through the common axis of the guide and receiver shafts and perpendicular to a plane which passes through the angle of diversion of the drive shaft and the secondary shaft.

For an understanding of the principles of the invention, reference is made to the following description of a typical embodiment thereof as illustrated in the accompanying drawing.

BRIEF DESCRIPTION OF THE DRAWING

In the drawing, the single FIGURE is an axial sectional view through a power transmission embodying the invention.

DESCRIPTION OF THE PREFERRED EMBODIMENT

Referring to the drawing, the transmission includes a guide drive shaft A and a driven receiver shaft B which are coaxial with each other on the same axis of symmetry $a$–$b$. The shafts A and B are suitably separated to provide a space in which there is located a coordinating device, such as a universal joint U. The geometrical center O of universal joint U is located on the common axis $a$–$b$ of the drive and driven shafts.

The drive between the drive shaft A and the driven shaft B is effective through a secondary shaft C extending at an angle to the axis $a$–$b$, the angle being indicated at $\alpha$. The axes of symmetry $a$, $b$ and $c$ of the three shafts A, B, and C intersect each other at the geometrical center O of the universal joint U which may be a gimbal, a ball and socket joint, or the like.

Secondary shaft C carries a frusto-conical pinion P which is either secured thereto or is made integral therewith, this pinion meshing with a frusto-conical internal ring gear Q which is either carried by or is integral with a support S which, in turn, is either secured to or is integral with the driven receiver shaft B. Preferably, a spacer T is secured in the support S and is provided with a balancing part formed with an annular channel D which serves to receive and guide the free end of the secondary shaft C.

The arrangement may be carried out in various ways. For example, the driven receiver shaft B can rotate freely about its own axis and includes a housing which receives the end of secondary shaft C which revolves freely inside this housing and at a point diametrically opposite a counterweight for the static and dynamic equilibrium of the transmission.

Between the pinion P on the shaft C, and the universal joint U, there is mounted, on the shaft C, or formed integrally therewith, an inertia wheel V, having a bell shape R, which is perfectly balanced with respect to the shaft C and with respect to the geometrical center O at which the axes of symmetry of the three shafts intersect.

If the moments of inertia of the several parts are designated $\mu$, the assembly of masses rotating about the axis of symmetry of shaft C, designated $\mu c$ and those rotating around the common axis $a$–$b$ designated $\mu ab$, these moments of inertia either are equal to or differ from 1. The power transmission of the invention permits a rational and flexible transmission of the mechanical power. The drive force of pinion P, rotating at a speed $\omega$ around axis C, transmits to the inertia wheel V, having the bell shape R, and rotating around the axis of symmetry $c$ of the secondary shaft C at an angular velocity $\omega c$ and revolving around the common axis $a$–$b$ at an angular velocity $\omega ab$, the sum of these forces as follows:

$$\mu c \cdot \omega c + \mu ab \cdot \omega ab =.$$

The transmission of the present invention is designed for very high angular velocities, and the precession force of the gryroscopic wheel R - V produces, in the assembly B - S - Q, an angular velocity or rotating force which is variable with the resistance encountered.

While a specific embodiment of the invention has been shown and described in detail to illustrate the application of the principles of the invention, it will be understood that the invention may be embodied otherwise without departing from such principles.

What is claimed is:

1. A power transmission, for equilibrium of forces transmitted by precession of a gyroscope rotor, comprising, in combination, a rotatable drive guide shaft rotatable with the gyroscope rotor; a rotatable driven receiver shaft coaxial with said drive guide shaft; said drive guide shaft and said driven receiver shaft having facing ends spaced axially from each other; a rotatable secondary shaft extending at an angle to the common axis of said drive guide shaft and said driven receiver shaft; a universal joint interconnecting the facing end of said drive guide shaft to a first end of said secondary shaft, and having a geometrical center; the axes of symmetry of said guide shaft, said driven receiver shaft and said secondary shaft intersecting at said geometrical center; a frusto-conical internal ring gear rotatable with said driven receiver shaft; a frusto-conical pinion rotatable with said secondary shaft and meshing with said internal ring gear, said pinion being positioned intermediate the ends of said secondary shaft; the apices of the frusto-conical surfaces of said internal ring gear in said pinion intersecting said common axis at said geometrical center; means, including a support rotatable with said driven receiver shaft, defining an annular channel receiving and guiding the end of said secondary shaft opposite said first end for revolving of said secondary shaft about said common axis at a fixed constant angle to said common axis; and a rotationally symmetric inertia device coaxial with said secondary shaft adjacent said first end for rotating therewith to regulate the speed thereof; said frusto-conical pinion transmitting, to said inertia device, the sum of the product of the moments of inertia and the angular velocity of the masses rotating about the axis of symmetry of said secondary shaft and the product of the moment of inertia and the angular velocity of the masses rotating about said common axis.

2. A power transmission, as claimed in claim 1, in which said frusto-conical internal ring gear is carried by said support.

3. A power transmission, as claimed in claim 2, in which said ring gear is integral with said support.

4. A power transmission, as claimed in claim 2, in which said support is cup-shaped, opening toward said drive guide shaft; said ring gear being formed on the internal periphery of said cup-shaped support; said means defining an annular channel including a spacer seated in said cup-shaped support and having said annular channel formed therein.

5. A power transmission, as claimed in claim 1, including a roller rotatable mounted adjacent said opposite end of said secondary shaft and engaged in said annular channel.

6. A power transmission, as claimed in claim 1, in which said inertia device comprises a counterweight on said secondary shaft.

7. A power transmission, as claimed in claim 6, in which said counterweight is bell-shaped, has a thickened rim, and is integral with said secondary shaft.

8. A power transmission, as claimed in claim 6, in which the center of gravity of said secondary shaft and said counterweight coincides with said geometrical center and the center of gravity of said universal joint, thereby obtaining static and dynamic equilibrium of said power transmission.

* * * * *